United States Patent
Hirashima et al.

(10) Patent No.: US 11,208,704 B2
(45) Date of Patent: *Dec. 28, 2021

(54) HIGH-STRENGTH COLD-ROLLED STEEL SHEET AND METHOD OF PRODUCING THE SAME

(71) Applicant: JFE Steel Corporation, Tokyo (JP)

(72) Inventors: Takuya Hirashima, Tokyo (JP); Hiromi Yoshitomi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 64 days.

This patent is subject to a terminal disclaimer.

(21) Appl. No.: 16/475,426

(22) PCT Filed: Apr. 19, 2017

(86) PCT No.: PCT/JP2017/015713
§ 371 (c)(1),
(2) Date: Jul. 2, 2019

(87) PCT Pub. No.: WO2018/127984
PCT Pub. Date: Jul. 12, 2018

(65) Prior Publication Data
US 2019/0345577 A1    Nov. 14, 2019

(30) Foreign Application Priority Data
Jan. 6, 2017    (JP) ............................. JP2017-000884

(51) Int. Cl.
| | | |
|---|---|---|
| *C21D 9/46* | (2006.01) | |
| *B32B 15/01* | (2006.01) | |
| *C21D 6/00* | (2006.01) | |
| *C21D 8/02* | (2006.01) | |
| *C22C 38/00* | (2006.01) | |
| *C22C 38/02* | (2006.01) | |
| *C22C 38/06* | (2006.01) | |
| *C22C 38/08* | (2006.01) | |
| *C22C 38/12* | (2006.01) | |
| *C22C 38/14* | (2006.01) | |
| *C22C 38/16* | (2006.01) | |
| *C22C 38/28* | (2006.01) | |
| *C22C 38/32* | (2006.01) | |
| *C22C 38/38* | (2006.01) | |
| *C23C 2/02* | (2006.01) | |
| *C23C 2/06* | (2006.01) | |
| *C23C 2/40* | (2006.01) | |

(52) U.S. Cl.
CPC .............. *C21D 9/46* (2013.01); *B32B 15/013* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 38/001* (2013.01); *C22C 38/002* (2013.01); *C22C 38/005* (2013.01); *C22C 38/02* (2013.01); *C22C 38/06* (2013.01); *C22C 38/08* (2013.01); *C22C 38/12* (2013.01); *C22C 38/14* (2013.01); *C22C 38/16* (2013.01); *C22C 38/28* (2013.01); *C22C 38/32* (2013.01); *C22C 38/38* (2013.01); *C23C 2/02* (2013.01); *C23C 2/06* (2013.01); *C23C 2/40* (2013.01); *C21D 2211/001* (2013.01); *C21D 2211/002* (2013.01); *C21D 2211/003* (2013.01); *C21D 2211/005* (2013.01); *C21D 2211/008* (2013.01)

(58) Field of Classification Search
CPC ................................. C21D 9/46; B32B 15/013
USPC ........................................................ 148/533
See application file for complete search history.

(56) References Cited

U.S. PATENT DOCUMENTS

| | | | |
|---|---|---|---|
| 10,329,638 B2 | 6/2019 | Kimura et al. | |
| 2008/0075971 A1 | 3/2008 | Sun | |
| 2011/0186189 A1 | 8/2011 | Futamura | |
| 2012/0305122 A1 | 12/2012 | Ishikawa et al. | |
| 2013/0167980 A1 | 7/2013 | Kawata et al. | |
| 2014/0087208 A1 | 3/2014 | Toda et al. | |
| 2016/0319385 A1* | 11/2016 | Hasegawa | C22C 38/00 |

(Continued)

FOREIGN PATENT DOCUMENTS

| | | |
|---|---|---|
| CN | 102140608 A | 8/2011 |
| CN | 102666899 A | 9/2012 |

(Continued)

OTHER PUBLICATIONS

First Office Action dated Sep. 29, 2020, of counterpart Chinese Application No. 201780082300.0, along with a Search Report in English.

(Continued)

*Primary Examiner* — Weiping Zhu
(74) *Attorney, Agent, or Firm* — DLA Piper LLP (US)

(57) ABSTRACT

A high-strength cold-rolled steel sheet has a component composition containing, on a percent by mass basis, C: 0.12% or more and 0.25% or less, Si: less than 0.5%, Mn: 2.0% or more and 3.0% or less, P: 0.05% or less, S: 0.005% or less, Al: 0.01% or more and 0.10% or less, and N: 0.010% or less, the balance being Fe and incidental impurities, the total area percentage of martensite and tempered martensite satisfying 20% or more and 90% or less, the area percentage of ferrite satisfying 10% or less, the area percentage of bainite satisfying 10% or more and 80% or less, the area percentage of a martensite-austenite constituent in the bainite being 1% or more and 10% or less, the area percentage of cementite having an average grain size of 1 μm or less in the bainite being 0.1% or more and 5.0% or less.

11 Claims, 1 Drawing Sheet

(56) References Cited

U.S. PATENT DOCUMENTS

| | | | |
|---|---|---|---|
| 2018/0105908 A1 | 4/2018 | Hayashi et al. | |
| 2020/0032364 A1* | 1/2020 | Hirashima | C22C 38/14 |

FOREIGN PATENT DOCUMENTS

| | | |
|---|---|---|
| CN | 104160055 A | 11/2014 |
| CN | 105209650 A | 12/2015 |
| EP | 0484960 A2 | 5/1992 |
| EP | 2505681 A1 | 10/2012 |
| EP | 2824210 A1 | 1/2015 |
| EP | 2998414 A1 | 3/2016 |
| EP | 3 178 956 A1 | 6/2017 |
| EP | 3279351 A1 | 2/2018 |
| JP | 2015-218365 A | 12/2015 |
| JP | 5958659 B2 | 8/2016 |
| JP | 5958666 B1 | 8/2016 |
| WO | 2011/065578 A1 | 6/2011 |
| WO | 2015/093043 A1 | 6/2015 |
| WO | 2016/021194 A1 | 2/2016 |
| WO | 2016/103535 A1 | 6/2016 |
| WO | 2016/157862 A1 | 10/2016 |
| WO | 2016/171237 A1 | 10/2016 |
| WO | 2016/194272 A1 | 12/2016 |

OTHER PUBLICATIONS

Office Action dated Sep. 8, 2020, of counterpart Korean Application No. 10-2019-7018782, along with an English translation and a Concise Statement of Office Action in English.

The Extended European Search Report dated Sep. 19, 2019, of counterpart European Application No. 17890361.3.

The Official Action dated Jun. 21, 2021, in corresponding U.S. Appl. No. 16/484,563.

* cited by examiner

HIGH-STRENGTH COLD-ROLLED STEEL SHEET AND METHOD OF PRODUCING THE SAME

TECHNICAL FIELD

This disclosure relates to high-strength cold-rolled steel sheets used for automotive components and the like, and methods of producing the high-strength cold-rolled steel sheets. Specifically, this disclosure relates to a high-strength cold-rolled steel sheet having a low yield ratio and excellent in bendability, and a method of producing the high-strength cold-rolled steel sheet.

BACKGROUND

From the viewpoint of protecting the global environment, an improvement in the fuel economy of automobiles has recently become an important issue. To deal with this, efforts are actively underway to reduce the weight of automotive bodies by increasing the strength of steel sheets used for automotive bodies and using the steel sheets with smaller thicknesses. In addition to the increase in the strength of steel sheets used for automotive bodies, safety is required for components used for frames of automotive bodies. A higher yield ratio is advantageous to improve crashworthiness. Thus, there is a strong demand for the development of a steel sheet having a high yield ratio.

In response to the demand, composite structural steel composed of bainite and martensite and in which formation of ferrite is inhibited has been developed. However, the increase in the strength of steel sheets degrades formability to make it difficult to process the steel sheet, leaving room for improvement. A high-strength steel sheet is often mainly processed by bending. It is important to improve bendability to improve formability. A bending test is typically performed at a rate of about 10 mm/s. In fact, steel sheets used for automobiles are formed at a higher rate. Even if cracking does not occur in the test at a normal rate, cracking may occur in high-speed forming actually performed. In steel sheets for automobiles, it is thus necessary to evaluate the characteristics in a high-speed bending test. As described above, there is a need for a steel sheet having high strength, a high yield ratio, and good bendability, particularly good bendability at high-rate deformation.

For example, JP 5958666 discloses a high-strength hot-dip galvanized steel sheet having a tensile strength of 980 MPa or more and a yield ratio of 0.65 or more and a method of producing the steel sheet. The steel sheet disclosed in JP 5958666 has a component composition containing, on a percent by mass basis, C: 0.11% or more and 0.20% or less, Si: less than 0.50%, Mn: 2.2% or more and 3.5% or less, P: 0.03% or less, S: 0.005% or less, Al: 0.08% or less, N: 0.006% or less, and B: 0.0002% or more and 0.0030% or less, the balance being Fe and incidental impurities. The steel microstructure contains, on an area percentage basis, less than 20% (including 0) of a ferrite phase, 50% or less (including 0%) of a bainite phase, 50% or more (including 100%) of a martensite phase, 70% or more (including 100%) autotempered martensite included in the martensite phase, and 2% or less (including 0%) retained austenite. However, the steel microstructure contains bainite and martensite. Although a high strength and a high yield ratio are obtained by finely dispersing carbide in autotempered martensite grains, a large difference in strength between bainite and autotempered martensite leads to a decrease in bendability, specifically, R/t being 2.0 or more.

JP 5958659 discloses a high-strength hot-dip galvanized steel sheet characterized by having a component composition containing, on a percent by mass basis, C: 0.05% or more and 0.15% or less, Si: 0.01% or more and 1.00% or less, Mn: 2.2% or more and 3.5% or less, P: 0.001% or more and 0.050% or less, S: 0.010% or less, sol. Al: 0.005% or more and 0.100% or less, N: 0.0001% or more and 0.0060% or less, and at least one of Nb: 0.01% or more and 0.10% or less and Ti: 0.01% or more and 0.10% or less, the balance being Fe and incidental impurities, in which the microstructure of the steel sheet at a position ½ of the thickness of the steel sheet contains, on an area percentage basis, 5% or more and 80% or less of a ferrite phase, 20% or more and 70% or less of a martensite phase, and 0% or more and 25% or less of a bainite phase, the hardness of the steel sheet at a position 5 μm from a surface layer of the steel sheet in the thickness direction is 80% or less of the hardness of the steel sheet at the position ½ of the thickness, the hardness of the steel sheet at a position 15 μm from the surface layer of the steel sheet in the thickness direction is 90% or more of the hardness at the position ½ of the thickness, and the steel sheet has a tensile strength of 780 MPa or more and an endurance ratio of 0.42 or more. The steel sheet disclosed in JP 5958659 also has a microstructure containing bainite and martensite as described above and thus has high strength and good bendability. However, because 27% or more of ferrite is contained in a disclosed example, the yield ratio is as low as less than 0.65.

As described above, there is no high-strength steel sheet having a high yield ratio and good bendability. It could therefore be helpful to provide a high-strength cold-rolled steel sheet having a high yield ratio and good bendability and a method of producing the high-strength cold-rolled steel sheet. The term "high strength" refers to a tensile strength of 780 MPa or more. The term "high yield ratio" refers to a yield ratio of 0.65 or more. The term "good bendability" indicates that the bendability (R/t) is 1.5 or less.

SUMMARY

We provide a high-strength cold-rolled steel sheet having a high yield ratio and good bendability by controlling the component composition and production conditions to form a composite microstructure in which formation of ferrite is inhibited, the composite microstructure containing bainite and martensite, and by controlling the size and amounts of a martensite-austenite constituent (MA) and cementite in bainite.

[1] A high-strength cold-rolled steel sheet has a component composition containing, on a percent by mass basis, C: 0.12% or more and 0.25% or less, Si: less than 0.5%, Mn: 2.0% or more and 3.0% or less, P: 0.05% or less, S: 0.005% or less, Al: 0.01% or more and 0.10% or less, and N: 0.010% or less, the balance being Fe and incidental impurities, the total area percentage of martensite and tempered martensite satisfying 20% or more and 90% or less, the area percentage of ferrite satisfying 10% or less, the area percentage of bainite satisfying 10% or more and 80% or less, the area percentage of a martensite-austenite (MA) constituent in the bainite being 1% or more and 10% or less, the area percentage of cementite having an average grain size of 1 μm or less in the bainite being 0.1% or more and 5.0% or less.

[2] In the high-strength cold-rolled steel sheet described in [1], the component composition further contains, on a percent by mass basis, B: 0.005% or less.

[3] In the high-strength cold-rolled steel sheet described in [1] or [2], the component composition further contains, on a percent by mass basis, one or two or more elements selected from Nb: 0.005% or more and 0.1% or less, Ti: 0.005% or more and 0.1% or less, and V: 0.005% or more and 0.3% or less.

[4] In the high-strength cold-rolled steel sheet described in any one of [1] to [3], the component composition further contains, on a percent by mass basis, one or two or more elements selected from Mo: 0.2% or less, Cr: 1.0% or less, Cu: 1.0% or less, and Ni: 1.0% or less.

[5] In the high-strength cold-rolled steel sheet described in any one of [1] to [4], the component composition further contains, on a percent by mass basis, one or two elements selected from Ca: 0.0005% or more and 0.01% or less and REM: 0.0005% or more and 0.01% or less.

[6] The high-strength cold-rolled steel sheet described in any one of [1] to [5] further includes a coated layer on a surface thereof.

[7] In the high-strength cold-rolled steel sheet described in [6], the coated layer is a hot-dip galvanized (GI) layer, a hot-dip galvannealed (GA) layer, or a Zn—Al coated layer.

[8] A method of producing a high-strength cold-rolled steel sheet includes a hot-rolling step of rolling a slab having the component composition described in any one of [1] to [5] at a finish hot rolling temperature of 800° C. or higher and 1,000° C. or lower, performing cooling at an average cooling rate of 20° C./s or more, and performing coiling at a coiling temperature of 550° C. or higher and 700° C. or lower; a cold-rolling step of cold-rolling a hot-rolled steel sheet produced in the hot-rolling step at a rolling reduction of 20% or more; and an annealing step of performing primary annealing including primary heating to heat a cold-rolled steel sheet produced in the cold-rolling step in a temperature range of an $Ac_3$ point to 900° C., primary holding to hold the cold-rolled steel sheet in the temperature range of the $Ac_3$ point to 900° C. for 10 seconds or more and 1,200 seconds or less, and after primary holding, primary cooling to cool the cold-rolled steel sheet to a cooling stop temperature of 100° C. or lower at an average cooling rate of 3° C./s or more; after primary annealing, secondary annealing including secondary heating to heat the cold-rolled steel sheet in a temperature range of higher than the $Ac_3$ point to 900° C., secondary holding to hold the cold-rolled steel sheet in the temperature range of higher than the $Ac_3$ point to 900° C. for 10 seconds or more and 1,200 seconds or less, and after secondary holding, secondary cooling to cool the cold-rolled steel sheet to a cooling stop temperature of 350° C. or higher and 600° C. or lower at an average cooling rate of 10° C./s or more; after secondary annealing, tertiary holding to hold the cold-rolled steel sheet in the temperature range of 350° C. to 600° C. for 1 second or more and 1,200 seconds or less; and tertiary cooling to cool the cold-rolled steel sheet at an average cooling rate of 5° C./s or more.

[9] The method of producing a high-strength cold-rolled steel sheet described in [8] further includes, after the annealing step, a coating step of performing coating treatment on a surface of the cold-rolled steel sheet.

Our steel microstructure is a steel microstructure in which bainite and martensite are mainly contained, formation of ferrite is inhibited, and the amount of MA in bainite and the size and amount of cementite are controlled. The use of the component composition and the steel microstructure enables a high-strength cold-rolled steel sheet having a high yield ratio and good bendability to be provided.

In particular, our high-strength cold-rolled steel sheet is suitable as an automotive steel sheet. Use of the high-strength cold-rolled steel sheet for automotive structural members makes it possible to achieve both a reduction in the weight and an improvement in the crashworthiness of automobiles. That is, we enable automotive bodies to have higher performance.

DETAILED DESCRIPTION

Figure 1:
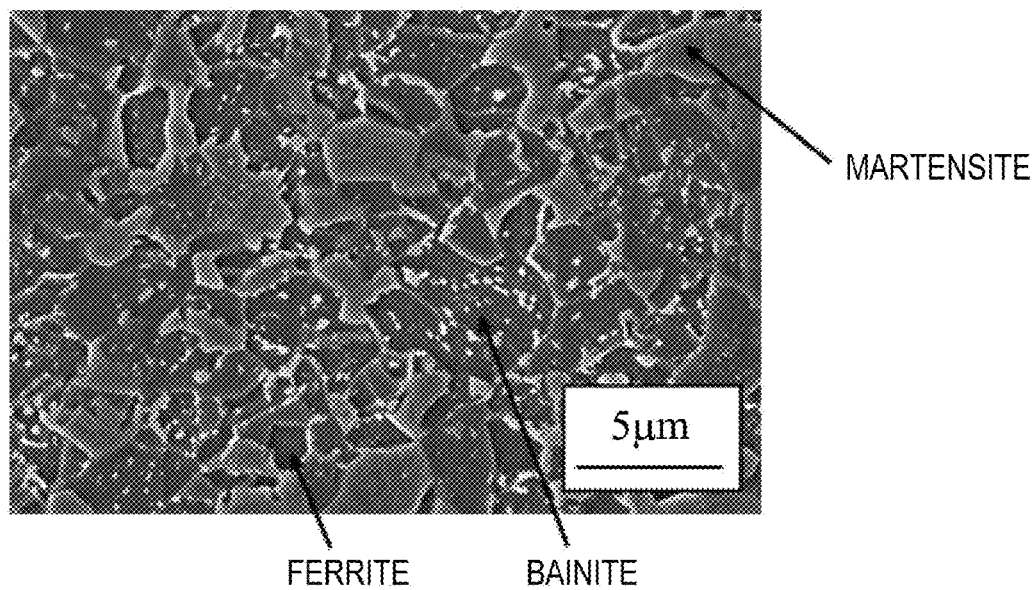
FIG. 1 illustrates an example of a microstructure in which area percentages are measured.

Examples of our steel sheets and methods will be described below. This disclosure is not, however, limited to the examples.

First, the component composition of a high-strength cold-rolled steel sheet will be described. In the following description, the symbol "%" that expresses component content refers to "% by mass".

C: 0.12% or More and 0.25% or Less

C significantly affects the strength of a steel sheet and thus needs to be contained to some extent. C is an element that reduces a transformation temperature. Thus, addition of C enables austenite annealing at a lower temperature and is significantly effective in inhibiting formation of ferrite. At a C content of less than 0.12%, even if the production conditions are controlled, desired tensile strength is not achieved. Accordingly, the C content is 0.12% or more, preferably 0.14% or more, more preferably 0.16% or more, even more preferably 0.18% or more. The use of a C content of more than 0.25% coarsens cementite in bainite to easily form voids in a temperature range of 350° C. to 600° C. during annealing, thus decreasing the bendability. Accordingly, the C content is 0.25% or less, preferably 0.23% or less, more preferably 0.22% or less, even more preferably 0.20% or less.

Si: Less than 0.5%

Si is an element that promotes formation of ferrite. A Si content of 0.5% or more makes it difficult to obtain the amount of ferrite to 10% or less, thus decreasing the yield ratio. Accordingly, the Si content is less than 0.5%, preferably 0.3% or less, more preferably 0.2% or less, even more preferably 0.1% or less. From the viewpoint of providing the desired advantageous effects, Si need not be contained (the Si content may be 0%). Considering that an excessive reduction in Si content may increase production costs, the Si content is preferably 0.0001% or more, more preferably 0.0003% or more.

Mn: 2.0% or More and 3.0% or Less

Mn is an element serving as a solid-solution strengthening element that increases the tensile strength of a steel sheet. Mn has the effect of increasing hardenability and thus inhibits formation of ferrite in the course of cooling during annealing. A Mn content of less than 2.0% makes it difficult to obtain the amount of ferrite to 10% or less to fail to achieve a desired tensile strength. Additionally, the yield ratio is decreased. Accordingly, the Mn content is 2.0% or more, preferably 2.2% or more, more preferably 2.3% or more, even more preferably 2.4% or more. A Mn content of more than 3.0% results in an excessive improvement in hardenability. The amount of martensite is more than 90%, thus causing a decrease in bendability. Accordingly, the Mn content is 3.0% or less, preferably 2.8% or less, more preferably 2.7% or less, even more preferably 2.6% or less.

P: 0.05% or Less

P is inevitably contained as an impurity element and segregates at prior austenite grain boundaries to embrittle the grain boundaries. This easily causes a break, thus decreasing bendability. Accordingly, the P content is preferably minimized and is 0.05% or less, preferably 0.03% or less. From the viewpoint of providing the desired advantageous effects, P need not be contained (the P content may be 0%). Considering that an excessive reduction in P content may increase production costs, the P content is preferably 0.0001% or more, more preferably 0.0003% or more.

S: 0.005% or Less

S is inevitably contained as an impurity element and forms MnS inclusions in steel. MnS inclusions act as starting points of cracks during processing to decrease bendability. Accordingly, the S content is preferably minimized. The S content is 0.005% or less, preferably 0.003% or less. From the viewpoint of providing the desired advantageous effects, S need not be contained (the S content may be 0%). Considering that an excessive reduction in S content may increase production costs, the S content is preferably 0.0001% or more, more preferably 0.0003% or more.

Al: 0.01% or More and 0.10% or Less

Al is an element added as a deoxidizer. The Al content needs to be 0.01% or more, is preferably 0.02% or more, more preferably 0.03% or more, even more preferably 0.04% or more to provide the effect. An Al content of more than 0.10% results in a decrease in the cleanliness of steel. Additionally, Al has an effect of increasing a transformation temperature. Accordingly, the Al content needs to be 0.10% or less, preferably 0.08% or less, more preferably 0.07% or less, more preferably 0.06% or less to inhibit formation of ferrite to obtain a high yield ratio.

N: 0.010% or Less

N is inevitably contained as an impurity element and has an effect of decreasing bendability by strain aging. Accordingly, the N content is preferably minimized. The N content is 0.010% or less, preferably 0.007% or less. From the viewpoint of providing the desired advantageous effects, N need not be contained (the N content may be 0%). Considering that an excessive reduction in N content may increase production costs, the N content is preferably 0.0001% or more, more preferably 0.0003% or more.

In addition to the foregoing components, the following components may be contained as optional components.

B: 0.005% or Less

B is an element that has an effect of enhancing hardenability to inhibit formation of ferrite during annealing. The B content is preferably 0.0001% or more, more preferably 0.0005% or more, even more preferably 0.0010% or more to provide the effect. However, even if the B content is more than 0.005%, the effect is saturated. Accordingly, for cost reduction, the B content is 0.005% or less, preferably 0.004% or less, more preferably 0.003% or less. One or two or more of Nb: 0.005% or more and 0.1% or less, Ti: 0.005% or more and 0.1% or less, and V: 0.005% or more and 0.3% or less These elements have the effect of improving tensile strength and yield strength without degrading ductility. Each element contained in an amount of less than 0.005% fails to effectively provide the desired effect. However, each element contained in an amount of more than a specified upper limit forms coarse carbide acting as starting points of formation of voids, thus decreasing bendability. These elements may be contained alone or in combination of two or more. The preferred range of the lower limit is described below. The Nb content is preferably 0.010% or more, more preferably 0.020% or more. The Ti content is preferably 0.010% or more, more preferably 0.020% or more. The V content is preferably 0.010% or more, more preferably 0.020% or more. The preferred range of the upper limit is described below. The Nb content is preferably 0.09% or less. The Ti content is preferably 0.09% or less. The V content is preferably 0.2% or less, more preferably 0.1% or less.

One or Two or More of Mo: 0.2% or Less, Cr: 1.0% or Less, Cu: 1.0% or Less, and Ni: 1.0% or Less These elements have an effect of enhancing hardenability to inhibit formation of ferrite during annealing. The Mo content is preferably 0.001% or more, more preferably 0.010% or more, even more preferably 0.050% or more to provide the effect. The Cr content is preferably 0.001% or more, more preferably 0.005% or more, even more preferably 0.010% or more. The Cu content is preferably 0.001% or more, more preferably 0.005% or more, even more preferably 0.010% or more. The Ni content is preferably 0.001% or more, more preferably 0.005% or more, even more preferably 0.010% or more. However, in each of the elements, even if the content is more than a specified upper limit, the effect is saturated. Thus, in each element, the content is equal to or less than the specified upper limit for cost reduction. The preferred range of the upper limit is described below. The Mo content is preferably 0.15% or less. The Cr content is preferably 0.7% or less, more preferably 0.4% or less. The Cu content is preferably 0.9% or less, more preferably 0.7% or less. The Ni content is preferably 0.9% or less, more preferably 0.7% or less. These elements may be contained alone or in combination of two or more.

One or Two of Ca: 0.0005% or More and 0.01% or Less and REM: 0.0005% or More and 0.01% or Less These elements have the effects of reducing the size of inclusions, reducing starting points of breakage, and increasing bendability. The use of Ca and/or REM contained in an amount of 0.0005% or more, more preferably 0.0010% or more, even more preferably 0.0015% or more is effective in providing these effects. However, the use of Ca and/or REM contained in an amount of more than 0.01% coarsens inclusions acting as starting points of formation of voids, thus decreasing bendability. Accordingly, each of the Ca content and the REM content is 0.01% or less, preferably 0.007% or less, more preferably 0.004% or less. Ca and REM may be contained alone or in combination of two or more.

The balance, other than the foregoing components, is Fe and incidental impurities. When any of the foregoing components has a lower limit, the desired advantageous effects are not impaired even if the component is contained in an amount less than the lower limit. Thus, the optional component contained in an amount less than the lower limit is regarded as an incidental impurity.

The steel microstructure of the high-strength cold-rolled steel sheet will be described below.

Total of Martensite and Tempered Martensite: 20% or More and 90% or Less

The steel microstructure needs to contain martensite to provide high tensile strength. It is difficult to ensure high strength when the area percentage of the total of martensite and tempered martensite is less than 20% with respect to the entire steel microstructure. Accordingly, the area percentage of the total of martensite-austenite and tempered martensite is 20% or more, preferably 25% or more, more preferably 30% or more, even more preferably 35% or more. When the area percentage of the total of martensite and tempered martensite is more than 90% with respect to the entire steel microstructure, it is difficult to ensure desired bendability. Accordingly, the area percentage of the total of martensite and tempered martensite is 90% or less, preferably 80% or less, more preferably 70% or less, even more preferably 60% or less. Tempered martensite has low strength and good ductility, compared to martensite. The percentages of tempered martensite and martensite may be controlled in accordance with required properties. Thus, the martensite content and the tempered martensite content are not particularly limited. The percentage of martensite is often 20% or less with respect to the total of martensite and tempered martensite. The percentage of tempered martensite is often 80% or more with respect to the total of martensite and tempered martensite.

Area Percentage of Ferrite: 10% or Less

The yield ratio is increased by controlling formation of soft ferrite. The area percentage of ferrite needs to be 10% or less with respect to the entire steel microstructure to effectively provide the effect. Accordingly, the area percentage of ferrite is 10% or less, preferably 6% or less, more preferably less than 5%, even more preferably 4% or less. From the viewpoint of providing the desired advantageous effects, ferrite need not be contained (the area percentage of ferrite may be 0%). When it is difficult to obtain the area percentage of ferrite to 0%, the area percentage of ferrite is preferably 1% or more, more preferably 2% or more.

Area Percentage of Bainite: 10% or More and 80% or Less

Bainite is a hard microstructure. Bainite is a microstructure having a good balance between strength and ductility because of its uniform hardness distribution. It is difficult to ensure specified bendability at an area percentage of bainite of less than 10% with respect to the entire steel microstructure. Accordingly, the area percentage of bainite is 10% or more, preferably 20% or more, more preferably 25% or more, even more preferably 30% or more. Bainite is softer than martensite. Thus, it is difficult to ensure high strength at an area percentage of bainite of more than 80% with respect to the entire steel microstructure. Accordingly, the area percentage of bainite is 80% or less, preferably 70% or less, more preferably 60% or less, even more preferably 55% or less. Bainite used here includes both of upper bainite and lower bainite.

Area Percentage of MA in Bainite: 1% or More and 10% or Less

MA has the effect of improving ductility. The area percentage of MA in bainite needs to be 1% or more, preferably 2% or more, more preferably 3% or more, even more preferably 4% or more (with respect to 100% of the entire steel microstructure) to provide the effect. At an area percentage of MA of more than 10%, voids are easily formed because of a difference in hardness between MA and an adjacent constituent, thus decreasing bendability. Accordingly, the area percentage of MA is 10% or less, preferably 9% or less, more preferably 8% or less, even more preferably 7% or less. The term "MA" refers to martensitic islands precipitated in bainite and differs from martensite and tempered martensite.

Area Percentage of Cementite Having Average Grain Size of 1 μm or Less in Bainite: 0.1% or More and 5.0% or Less Cementite having an average grain size of 1 μm or less in bainite increases the strength of bainite and reduces a difference in hardness between bainite and martensite, thereby increasing the yield ratio and bendability. The area percentage of cementite having an average grain size of 1 μm or less in bainite needs to be 0.1% or more, preferably 0.5% or more, more preferably 1.0% or more, even more preferably 2.0% or more (with respect to 100% of the entire steel microstructure) to provide the effects. If the area percentage of cementite having an average grain size of 1 μm or less in bainite is more than 5.0%, voids are easily formed to cause a decrease in bendability. Accordingly, the area percentage of cementite having an average grain size of 1 μm or less in bainite is 5.0% or less, preferably 4.5% or less, more preferably 4.0% or less, even more preferably 3.8% or less.

The high-strength cold-rolled steel sheet may include a coated layer. The type of the coated layer is not particularly limited. Examples thereof include a hot-dip galvanized layer and hot-dip galvannealed layer.

A method of producing a high-strength cold-rolled steel sheet will be described below. The method of producing a high-strength cold-rolled steel sheet includes a hot-rolling step, a cold-rolling step, and an annealing step. Additionally, a coating step is included after the annealing step, as needed. These steps will be described below. The term "temperature" refers to a surface temperature.

Hot-Rolling Step

The hot-rolling step is a step of hot-rolling a slab having the component composition described above at a finish hot rolling temperature of 800° C. or higher and 1,000° C. or lower, performing cooling at an average cooling rate of 20° C./s or more, and performing coiling at a coiling temperature of 550° C. or higher and 700° C. or lower.

The temperature of the slab subjected to hot rolling is preferably 1,000° C. or higher. At a slab temperature of lower than 1,000° C., carbide may fail to be sufficiently dissolved. Furthermore, the temperature of steel during rolling may decrease to a ferrite transformation temperature, and the steel may be subjected to rolling in a state in which the steel microstructure contains ferrite. Accordingly, the temperature of the slab is preferably 1,000° C. or higher to complete the rolling in a single-phase austenite temperature region and achieve high bendability and high strength after annealing. The upper limit of the slab heating temperature is preferably 1,350° C. or lower.

The finish hot rolling temperature is 800° C. or higher and 1,000° C. or lower. Ferrite is formed during rolling at a finish hot rolling temperature of lower than 800° C. Pearlite is formed during subsequent cooling and coiling. Cementite in pearlite does not melt and is left during holding in the temperature range of the $Ac_3$ point to 900° C. in the subsequent annealing step. Cementite coarsens in the temperature range of the $Ac_3$ point to 900° C., thus decreasing the bendability and the yield ratio. Accordingly, the finish hot rolling temperature is 800° C. or higher, preferably 850° C. or higher, more preferably 870° C. or higher. The finish hot rolling temperature is 1,000° C. or lower, preferably 960° C. or lower, more preferably 900° C. or lower because of a difficulty in subsequent cooling to a coiling temperature. The $Ac_3$ point used here is calculated from an equation described below. In the equation, each "% symbol of element" indicates element content (% by mass). When the element is not contained, the relevant "% symbol of element" is zero.

$$Ac_3=910-203(\% \text{ C})+45(\% \text{ Si})-30(\% \text{ Mn})-20(\% \text{ Cu})-15(\% \text{ Ni})+11(\% \text{ Cr})+32(\% \text{ Mo})+104(\% \text{ V})+400(\% \text{ Ti})+460(\% \text{ Al})$$

After finish hot rolling, cooling is performed to the coiling temperature at an average cooling rate of 20° C./s or more. At an average cooling rate of less than 20° C./s after the finish hot rolling, austenite grains coarsen excessively. Additionally, pearlite is formed in the steel. Cementite in pearlite does not melt and is left during holding in the temperature range of the $Ac_3$ point to 900° C. in the annealing, thus decreasing bendability and the yield ratio. Accordingly, the average cooling rate needs to be 20° C./s or more, preferably 30° C./s or more, more preferably 40° C./s or more. A cooling method is preferably water cooling. The upper limit of the average cooling rate is preferably, but not necessarily, 90° C./s or less, more preferably 70° C./s or less.

Coiling is performed at a coiling temperature of 550° C. or higher and 700° C. or lower after cooling. At a coiling temperature of lower than 550° C., the steel microstructure contains a hard phase, thereby degrading cold rollability. Recrystallization does not easily occur in the subsequent annealing step, thus decreasing bendability. Accordingly, the coiling temperature needs to be 550° C. or higher, preferably 570° C. or higher, more preferably 590° C. or higher. A coiling temperature of higher than 700° C. results in coarsening of ferrite grains and growth of formed cementite. The coarse cementite does not melt and is left during holding in the temperature range of the $Ac_3$ point to 900° C. in the annealing, thus decreasing bendability and the yield ratio. Accordingly, the coiling temperature is 700° C. or lower, preferably 660° C. or lower, more preferably 630° C. or lower.

Cold-Rolling Step

The cold-rolling step is a step of cold-rolling a hot-rolled steel sheet produced in the hot-rolling step at a rolling reduction of 20% or more.

In the cold-rolling step, the hot-rolled steel sheet is subjected to pickling and then subjected to cold rolling at a rolling reduction of 20% or more to produce a cold-rolled steel sheet. At a rolling reduction of less than 20%, recrystallization does not easily occur in the subsequent annealing step. Ferrite is left to decrease the yield ratio when transformation to austenite is inhibited. Accordingly, the rolling reduction is 20% or more, preferably 25% or more, more preferably 30% or more. The upper limit of the rolling reduction is preferably, but not necessarily, 90% or less, more preferably 80% or less.

Annealing Step

The annealing step includes subjecting the cold-rolled steel sheet produced in the cold-rolling step to primary annealing, secondary annealing, tertiary holding, and tertiary cooling under upper-limit conditions described below.

Primary Annealing: Primary annealing includes a primary heating to heat the cold-rolled steel sheet produced in the cold-rolling step in a temperature range of an $Ac_3$ point to 900° C., a primary holding to hold the cold-rolled steel sheet in the temperature range of the $Ac_3$ point to 900° C. for 10 seconds or more and 1,200 seconds or less, and after primary holding, primary cooling to cool the cold-rolled steel sheet to a cooling stop temperature of 100° C. or lower at an average cooling rate of 3° C./s or more.

Secondary Annealing: Secondary annealing after primary annealing includes secondary heating to heat the cold-rolled steel sheet in a temperature range of higher than the $Ac_3$ point to 900° C., secondary holding to hold the cold-rolled steel sheet in the temperature range of higher than the $Ac_3$ point to 900° C. for 10 seconds or more and 1,200 seconds or less, and after secondary holding, secondary cooling to cool the cold-rolled steel sheet to a cooling stop temperature of 350° C. or higher and 600° C. or lower at an average cooling rate of 10° C./s or more.

Tertiary Holding: Tertiary holding after secondary annealing holds the cold-rolled steel sheet in a temperature range of 350° C. to 600° C. for 1 second or more and 1,200 seconds or less.

Tertiary Cooling: Tertiary cooling after tertiary holding cools the cold-rolled steel sheet at an average cooling rate of 5° C./s or more.

In primary annealing, the cold-rolled steel sheet is heated to an annealing heating temperature of the $Ac_3$ point to 900° C., which is within the single-phase austenite temperature region, held for 10 to 1,200 seconds, and cooled to a cooling stop temperature of 100° C. or lower at an average cooling rate of 3° C./s or more. As described above, it is necessary to inhibit formation of ferrite and form a composite microstructure containing bainite and martensite. To inhibit formation of ferrite, a microstructure in which a difference in the concentration of each component is small before the start of secondary annealing needs to be obtained. Thus, treatment that causes the concentration of each alloying element in the microstructure to be uniform is performed in primary annealing. At this time, if ferrite is formed, the alloying elements are concentrated in austenite to cause the microstructure to have a nonuniform concentration of each alloying element. In this nonuniform microstructure, transformation from ferrite to austenite is inhibited during subsequent secondary annealing. A large amount of ferrite is formed in the final microstructure, thus leading to a decrease in yield ratio. Accordingly, the annealing heating temperature in primary annealing needs to be the $Ac_3$ point or higher, preferably the $Ac_3$ point+10° C. or higher, more preferably the $Ac_3$ point+20° C. or higher. At an annealing heating temperature of higher than 900° C., austenite coarsens and is transformed into martensite or bainite while being coarsened, thus leading to a decrease in yield ratio. Accordingly, the annealing heating temperature in the primary annealing substep is 900° C. or lower, preferably 880° C. or lower, more preferably 860° C. or lower.

The holding time in primary annealing is 10 to 1,200 seconds. When the holding time in primary annealing is less than 10 seconds the dissolution of carbide and austenite transformation do not proceed sufficiently, thus resulting in a microstructure that contains residual ferrite and has a difference in the concentration of each alloying element before secondary annealing. If the microstructure is subjected to secondary annealing as it is, transformation from ferrite to austenite is inhibited. A large amount of ferrite is formed in the final microstructure, thus leading to a decrease in yield ratio. Accordingly, the holding time in primary annealing needs to be 10 seconds or more, preferably 20 seconds or more, more preferably 40 seconds or more. When the holding time in primary annealing is more than 1,200 seconds, austenite grains are increased in size and transformed into martensite or bainite while being coarsened, thus leading to a decrease in yield ratio. Accordingly, the holding time in primary annealing is preferably 1,200 seconds or less, more preferably 1,100 seconds or less, even more preferably 1,000 seconds or less.

The average cooling rate in primary cooling after holding is 3° C./s or more. When the average cooling rate in primary cooling is less than 3° C./s, a large amount of ferrite is formed, and remaining carbide is grown. When ferrite remains, the microstructure has a difference in the concentration of each alloying element. If the microstructure is subjected to secondary annealing as it is, transformation from ferrite to austenite is inhibited. A large amount of ferrite is formed in the final microstructure, thus leading to a decrease in yield ratio. Accordingly, the average cooling rate in primary cooling needs to be 3° C./s or more, preferably 4° C./s or more. The upper limit of the average cooling rate is preferably, but not necessarily, 20° C./s or less, more preferably 10° C./s or less.

The cooling stop temperature in primary cooling needs to be 100° C. or lower from the viewpoints of achieving a satisfactory average cooling rate and inhibiting coarsening of carbide. A cooling stop temperature of higher than 100° C. results in coarsening of carbide to cause a nonuniform concentration distribution of carbon in the microstructure. If the microstructure is subjected to secondary annealing as it is, transformation from ferrite to austenite is inhibited in a region having a low carbon concentration. A large amount of ferrite is formed in the final microstructure, thus leading to a decrease in yield ratio. The cooling stop temperature in primary cooling is preferably 80° C. or lower. The lower limit of the cooling stop temperature described above is preferably, but not necessarily, 10° C. or higher, more preferably 20° C. or higher.

In secondary annealing, the steel sheet that has been subjected to primary annealing is heated to an annealing heating temperature of higher than the $Ac_3$ point to 900° C., which is within the single-phase austenite temperature region, and then held for 10 to 1,200 seconds. Formation of ferrite is inhibited, and the composite microstructure containing bainite and martensite is formed. To this end, a single-phase austenite microstructure needs to be obtained during annealing. Accordingly, the annealing heating temperature is higher than the $Ac_3$ point, preferably the $Ac_3$ point+10° C. or higher, more preferably the $Ac_3$ point+20° C. or higher. At an annealing heating temperature of higher than 900° C., austenite coarsens and is transformed into martensite or bainite while being coarsened, thus making it difficult to obtain a high yield ratio. Accordingly, the annealing heating temperature is 900° C. or lower, preferably 880° C. or lower, more preferably 860° C. or lower.

The holding time in secondary annealing is 10 to 1,200 seconds. When the holding time in secondary annealing is less than 10 seconds, dissolution of carbide and austenite transformation do not proceed sufficiently. Thus, ferrite remains in the final microstructure and decreases the yield ratio. Accordingly, the holding time in secondary annealing is 10 seconds or more, preferably 13 seconds or more, more preferably 16 seconds or more. When the holding time in secondary annealing is more than 1,200 seconds, austenite grains are increased in size and transformed into martensite or bainite while being coarsened, thus leading to a decrease in yield ratio. Accordingly, the holding time in secondary annealing is 1,200 seconds or less, more preferably 1,100 seconds or less, even more preferably 1,000 seconds or less.

After holding, cooling is performed at an average cooling rate of 10° C./s or more. When the average cooling rate in secondary cooling is less than 10° C./s, ferrite is formed. It is difficult to achieve a ferrite fraction of 10% or less in the final microstructure, thus decreasing the yield ratio. Accordingly, the average cooling rate in secondary cooling is 10° C./s or more, more preferably 14° C./s or more, more preferably 17° C./s or more. The upper limit of the average cooling rate is preferably, but not necessarily, 100° C./s or less, more preferably 50° C./s or less.

The cooling stop temperature in secondary cooling is 350° C. to 600° C. The reason the cooling stop temperature is in this range is that tertiary holding is performed in this temperature range.

In tertiary holding, the steel sheet that has been subjected to secondary annealing is held at a temperature of 350° C. to 600° C. for 1 to 1,200 seconds. At a temperature in tertiary holding of lower than 350° C., the alloying elements are less likely to diffuse, thus inhibiting bainite transformation to increase the amount of martensite in the microstructure. This results in excessively high strength, low ductility, and low bendability. Accordingly, the temperature in tertiary holding needs to be 350° C. or higher, preferably 400° C. or higher, more preferably 450° C. or higher. At a temperature in tertiary holding of higher than 600° C., cementite is formed and grows during holding. Thus, a large amount of cementite having a size of 1 μm or more in bainite is formed to decrease in the ductility of bainite, leading to a decrease in bendability of the final microstructure. Accordingly, the temperature in tertiary holding is 600° C. or lower, more preferably 570° C. or lower, more preferably 550° C. or lower.

The holding time in tertiary holding is 1 to 1,200 seconds. Bainite transformation does not occur sufficiently when the holding time in tertiary holding is less than 1 second. It is thus difficult to achieve a bainite fraction of 10% or more in the final microstructure, thereby leading to a decrease in bendability. Accordingly, the holding time in tertiary holding needs to be 1 second or more, preferably 20 seconds or more, more preferably 40 seconds or more. When the holding time in tertiary holding is more than 1,200 seconds, bainite is excessively formed, and the bainite fraction is more than 80%. It is thus difficult to achieve high strength. Accordingly, the holding time in tertiary holding is 1,200 seconds or less, preferably 1,100 seconds or less, more preferably 1,000 seconds or less.

In tertiary cooling, cooling is performed from the holding temperature in tertiary holding at an average cooling rate of 5° C./s or more. The cooling stop temperature is usually room temperature. The room temperature is 0° C. to 50° C. Formation and growth of bainite and the growth of carbide occur when the average cooling rate is less than 5° C./s. It is thus difficult to achieve a desired microstructure fraction and the cementite fraction in bainite, thus causing a decrease in bendability. Accordingly, the average cooling rate in tertiary cooling is 5° C./s or more, preferably 8° C./s or more. The upper limit is preferably, but not necessarily, 40° C./s or less, more preferably 30° C./s or less.

After the annealing step, a coating step of performing coating treatment on a surface may be included. As described above, the type of coated layer is not particularly limited. Thus, the type of coating treatment is not particularly limited. Examples thereof include hot-dip galvanization treatment and coating treatment in which alloying is performed after the treatment.

EXAMPLES

Our steel sheets and methods will be specifically described with reference to examples.

1. Production of Evaluation Steel Sheet

Steels having component compositions presented in Table 1 and containing the balance Fe and incidental impurities were formed in a vacuum melting furnace and then formed into slabs having a thickness of 27 mm. The slabs were hot-rolled to a sheet thickness of 4.0 mm. The hot rolling was performed under hot-rolling conditions presented in Table 2 and including a slab heating temperature of 1,250° C. The resulting hot-rolled steel sheets were ground and cold-rolled under conditions presented in Table 2 to produce cold-rolled steel sheets. The resulting cold-rolled steel sheets were heat-treated (annealed) under conditions presented in Table 2 to produce annealed cold-rolled steel sheets (high-strength cold-rolled steel sheets). In the examples, a secondary cooling stop temperature was equal to a tertiary holding temperature.

TABLE 1

| Type of steel | Chemical composition (% by mass) | | | | | | | | | | | | | | | | | $A_{c3}$ transformation point (°C.) |
|---|---|---|---|---|---|---|---|---|---|---|---|---|---|---|---|---|---|---|
| | C | Si | Mn | P | S | Al | N | Nb | Ti | V | Cr | Mo | Cu | Ni | B | Ca | REM | |
| A | 0.14 | 0.10 | 2.5 | 0.010 | 0.002 | 0.046 | 0.004 | 0.022 | | | | | | | 0.004 | | | 786 |
| B | 0.16 | 0.15 | 2.5 | 0.010 | 0.002 | 0.080 | 0.004 | | 0.020 | | 0.10 | | | | | | | 809 |
| C | 0.18 | 0.30 | 2.4 | 0.010 | 0.002 | 0.043 | 0.003 | 0.080 | | | | | | | 0.002 | | | 784 |
| D | 0.25 | 0.01 | 2.2 | 0.010 | 0.002 | 0.048 | 0.007 | | | 0.080 | | 0.10 | | | | | | 778 |
| E | 0.20 | 0.01 | 2.5 | 0.010 | 0.002 | 0.041 | 0.003 | | | | | | | | | | 0.002 | 765 |
| F | 0.12 | 0.01 | 2.8 | 0.010 | 0.002 | 0.041 | 0.003 | | | | | | 0.10 | 0.10 | | 0.002 | | 771 |
| G | 0.18 | 0.10 | 2.5 | 0.010 | 0.002 | 0.041 | 0.003 | | 0.080 | | | | | | | | | 806 |
| H | 0.18 | 0.01 | 2.5 | 0.010 | 0.002 | 0.041 | 0.003 | | | | | 0.80 | | | 0.002 | | | 779 |
| I | 0.18 | 0.01 | 2.5 | 0.010 | 0.003 | 0.041 | 0.003 | | | | | | 0.70 | 0.70 | | | | 746 |
| J | 0.18 | 0.60 | 2.5 | 0.030 | 0.002 | 0.041 | 0.003 | | | | | | | | | | | 797 |
| K | 0.10 | 0.01 | 2.4 | 0.010 | 0.002 | 0.043 | 0.003 | | | | | | | | | | | 794 |
| L | 0.35 | 0.01 | 2.4 | 0.010 | 0.002 | 0.043 | 0.003 | | | | | | | | | | | 738 |
| M | 0.18 | 0.01 | 1.6 | 0.010 | 0.002 | 0.041 | 0.003 | | | | | | | | | | | 796 |
| N | 0.18 | 0.01 | 3.7 | 0.010 | 0.002 | 0.041 | 0.003 | | | | | | | | | | | 733 |
| O | 0.14 | 0.10 | 2.4 | 0.070 | 0.002 | 0.042 | 0.004 | | | | | | | | | | | 786 |
| P | 0.14 | 0.20 | 2.2 | 0.010 | 0.007 | 0.041 | 0.003 | | | | | | | | | | | 796 |
| Q | 0.14 | 0.01 | 2.5 | 0.010 | 0.002 | 0.150 | 0.003 | | | | | | | | | | | 828 |
| R | 0.14 | 0.10 | 2.4 | 0.010 | 0.002 | 0.043 | 0.015 | | | | | | | | | | | 786 |

TABLE 2

| No. | Type of steel | Hot rolling Slab heating temperature °C | Hot rolling Finish hot rolling temperature °C | Hot rolling Average cooling rate °C/s | Hot rolling Coiling temperature °C | Cold rolling Rolling reduction % | Continuous annealing Primary annealing temperature °C | Continuous annealing Primary holding time s | Continuous annealing Primary cooling rate °C/s | Continuous annealing Primary cooling stop temperature °C | Continuous annealing Secondary annealing temperature °C | Continuous annealing Secondary holding time s | Continuous annealing Secondary cooling rate °C/s | Continuous annealing Tertiary holding temperature °C | Continuous annealing Tertiary holding time s | Continuous annealing Final cooling rate °C/s | Coating treatment | |
|---|---|---|---|---|---|---|---|---|---|---|---|---|---|---|---|---|---|---|
| 1 | A | 1250 | 880 | 60 | 600 | 56 | 840 | 51 | 5.8 | 50 | 786 | 17 | 18 | 470 | 63 | 22 | GI | Comparative Example |
| 2 | B | 1250 | 800 | 60 | 600 | 56 | 840 | 51 | 5.8 | 80 | 820 | 20 | 20 | 470 | 63 | 22 | GI | Example |
| 3 | B | 1250 | 950 | 60 | 600 | 56 | 840 | 51 | 5.8 | 50 | 860 | 17 | 23 | 470 | 63 | 22 | GI | Example |
| 4 | B | 1250 | 880 | 60 | 600 | 56 | 840 | 51 | 5.8 | 50 | 780 | 25 | 18 | 470 | 63 | 22 | GI | Comparative Example |
| 5 | B | 1250 | 880 | 20 | 600 | 56 | 840 | 51 | 5.8 | 45 | 820 | 17 | 20 | 470 | 63 | 22 | GI | Example |
| 6 | B | 1250 | 880 | 60 | 700 | 56 | 840 | 51 | 5.8 | 50 | 860 | 25 | 23 | 470 | 63 | 22 | GI | Example |
| 7 | C | 1250 | 750 | 60 | 600 | 56 | 840 | 51 | 5.8 | 50 | 780 | 17 | 18 | 470 | 63 | 22 | GI | Comparative Example |
| 8 | C | 1250 | 880 | 10 | 600 | 56 | 840 | 51 | 5.8 | 50 | 840 | 17 | 21 | 470 | 63 | 22 | GI | Comparative Example |
| 9 | C | 1250 | 880 | 60 | 500 | 56 | 840 | 51 | 5.8 | 40 | 840 | 24 | 16 | 500 | 73 | 19 | GI | Comparative Example |
| 10 | C | 1250 | 880 | 60 | 570 | 56 | 840 | 10 | 5.8 | 50 | 840 | 34 | 20 | 500 | 73 | 19 | GI | Example |
| 11 | C | 1250 | 880 | 40 | 600 | 50 | 860 | 40 | 5.0 | 40 | 860 | 26 | 70 | 500 | 60 | 20 | GI | Example |
| 12 | C | 1250 | 880 | 60 | 750 | 56 | 840 | 51 | 5.8 | 50 | 840 | 17 | 14 | 500 | 85 | 17 | GI | Comparative Example |
| 13 | D | 1250 | 880 | 60 | 600 | 10 | 840 | 51 | 5.8 | 50 | 840 | 30 | 18 | 470 | 63 | 22 | GI | Comparative Example |
| 14 | D | 1250 | 880 | 60 | 600 | 30 | 840 | 1000 | 5.8 | 45 | 840 | 17 | 20 | 470 | 0 | 22 | GI | Comparative Example |
| 15 | E | 1250 | 880 | 80 | 650 | 40 | 840 | 30 | 4.0 | 45 | 820 | 48 | 22 | 470 | 40 | 20 | GI | Example |
| 16 | E | 1250 | 880 | 60 | 600 | 25 | 860 | 51 | 5.8 | 50 | 840 | 1000 | 23 | 470 | 63 | 22 | GI | Example |
| 17 | E | 1250 | 880 | 60 | 600 | 56 | 740 | 51 | 5.8 | 50 | 840 | 17 | 18 | 470 | 63 | 22 | no | Comparative Example |
| 18 | E | 1250 | 880 | 60 | 600 | 56 | 800 | 51 | 3.0 | 50 | 840 | 17 | 20 | 470 | 10 | 22 | no | Comparative Example |
| 19 | E | 1250 | 880 | 60 | 600 | 56 | 840 | 51 | 5.8 | 40 | 840 | 18 | 20 | 470 | 63 | 8 | no | Example |
| 20 | E | 1250 | 880 | 60 | 600 | 56 | 840 | 5 | 5.8 | 50 | 840 | 37 | 20 | 470 | 63 | 22 | no | Comparative Example |
| 21 | E | 1250 | 880 | 60 | 600 | 56 | 840 | 1250 | 5.8 | 40 | 840 | 21 | 20 | 470 | 63 | 22 | no | Comparative Example |
| 22 | F | 1250 | 880 | 60 | 600 | 56 | 840 | 51 | 1.0 | 45 | 840 | 17 | 23 | 470 | 63 | 22 | no | Comparative Example |
| 23 | F | 1250 | 880 | 60 | 600 | 56 | 840 | 51 | 5.8 | 50 | 840 | 5 | 18 | 470 | 63 | 22 | no | Comparative Example |
| 24 | F | 1250 | 880 | 60 | 600 | 56 | 840 | 51 | 5.8 | 50 | 840 | 17 | 1 | 470 | 63 | 22 | no | Comparative Example |
| 25 | F | 1250 | 880 | 60 | 600 | 56 | 840 | 51 | 5.8 | 50 | 840 | 24 | 18 | 200 | 63 | 22 | no | Comparative Example |

TABLE 2-continued

| | | Hot rolling | | | | | Continuous annealing | | | | | | | | | | |
| | | | | | | | Primary | | | | | | | | | | |
| No. | Type of steel | Slab heating temperature °C. | Finish hot rolling temperature °C. | Average cooling rate °C./s | Coiling temperature °C. | Cold rolling Rolling reduction % | Primary annealing temperature °C. | Primary holding time s | Primary cooling rate °C./s | Primary cooling stop temperature °C. | Secondary annealing temperature °C. | Secondary holding time s | Secondary cooling rate °C./s | Tertiary holding temperature °C. | Tertiary holding time s | Final cooling rate °C./s | Coating treatment | |
|---|---|---|---|---|---|---|---|---|---|---|---|---|---|---|---|---|---|---|
| 26 | | 1250 | 880 | 60 | 600 | 56 | 840 | 51 | 5.8 | 150 | 840 | 24 | 18 | 350 | 63 | 22 | no | Comparative Example |
| 27 | | 1250 | 880 | 30 | 600 | 50 | 840 | 50 | 5.5 | 50 | 840 | 22 | 19 | 500 | 70 | 24 | no | Comparative Example |
| 28 | | 1250 | 880 | 60 | 600 | 56 | 840 | 51 | 5.8 | 50 | 840 | 17 | 18 | 550 | 1000 | 22 | no | Comparative Example |
| 29 | | 1250 | 880 | 60 | 600 | 56 | 840 | 51 | 5.8 | 50 | 840 | 29 | 18 | 650 | 63 | 22 | GA | Comparative Example |
| 30 | G | 1250 | 880 | 60 | 600 | 56 | 840 | 51 | 5.8 | 50 | 780 | 26 | 18 | 470 | 63 | 22 | GA | Comparative Example |
| 31 | | 1250 | 880 | 60 | 600 | 56 | 840 | 51 | 5.8 | 50 | 820 | 1250 | 20 | 470 | 63 | 22 | GA | Comparative Example |
| 32 | | 1250 | 880 | 50 | 600 | 56 | 820 | 51 | 5.8 | 45 | 840 | 400 | 21 | 470 | 63 | 21 | GA | Example |
| 33 | | 1250 | 880 | 60 | 600 | 56 | 840 | 51 | 5.8 | 40 | 860 | 17 | 23 | 470 | 63 | 22 | GA | Example |
| 34 | H | 1250 | 880 | 50 | 600 | 56 | 840 | 51 | 5.6 | 45 | 840 | 64 | 22 | 470 | 63 | 20 | GA | Comparative Example |
| 35 | | 1250 | 880 | 60 | 600 | 56 | 840 | 51 | 5.8 | 50 | 840 | 17 | 18 | 470 | 63 | 2 | GA | Comparative Example |
| 36 | | 1250 | 880 | 60 | 600 | 56 | 840 | 51 | 5.8 | 50 | 840 | 34 | 20 | 470 | 1250 | 10 | GA | Comparative Example |
| 37 | | 1250 | 880 | 60 | 600 | 56 | 840 | 51 | 5.8 | 40 | 840 | 17 | 23 | 470 | 63 | 22 | GA | Example |
| 38 | I | 1250 | 880 | 60 | 600 | 56 | 840 | 51 | 5.8 | 50 | 740 | 35 | 18 | 470 | 63 | 22 | GA | Comparative Example |
| 39 | | 1250 | 880 | 60 | 600 | 56 | 840 | 51 | 5.8 | 50 | 820 | 31 | 20 | 470 | 63 | 22 | no | Example |
| 40 | | 1250 | 880 | 60 | 600 | 56 | 840 | 51 | 5.8 | 50 | 860 | 35 | 23 | 470 | 63 | 22 | no | Comparative Example |
| 41 | J | 1250 | 880 | 60 | 600 | 56 | 840 | 51 | 5.8 | 50 | 820 | 43 | 20 | 470 | 63 | 22 | GI | Comparative Example |
| 42 | | 1250 | 880 | 60 | 600 | 56 | 840 | 51 | 5.8 | 50 | 860 | 39 | 23 | 470 | 63 | 22 | GA | Comparative Example |
| 43 | K | 1250 | 880 | 60 | 600 | 56 | 840 | 51 | 5.8 | 50 | 840 | 35 | 18 | 470 | 63 | 22 | GI | Comparative Example |
| 44 | L | 1250 | 880 | 60 | 600 | 56 | 840 | 51 | 5.8 | 40 | 840 | 19 | 18 | 470 | 63 | 22 | GI | Comparative Example |
| 45 | M | 1250 | 880 | 60 | 600 | 56 | 840 | 51 | 5.8 | 50 | 840 | 17 | 18 | 470 | 63 | 22 | GI | Comparative Example |
| 46 | N | 1250 | 880 | 60 | 600 | 56 | 840 | 51 | 5.8 | 50 | 840 | 31 | 18 | 470 | 63 | 22 | GI | Comparative Example |
| 47 | O | 1250 | 880 | 60 | 600 | 56 | 840 | 51 | 5.8 | 50 | 820 | 43 | 20 | 470 | 63 | 22 | GI | Comparative Example |
| 48 | P | 1250 | 880 | 60 | 600 | 56 | 840 | 51 | 5.8 | 50 | 860 | 39 | 23 | 470 | 63 | 22 | GA | Comparative Example |
| 49 | Q | 1250 | 880 | 60 | 600 | 56 | 840 | 51 | 5.8 | 50 | 840 | 35 | 18 | 470 | 63 | 22 | GI | Comparative Example |
| 50 | R | 1250 | 880 | 60 | 600 | 56 | 840 | 51 | 5.8 | 50 | 840 | 19 | 18 | 470 | 63 | 22 | GI | Comparative Example |

2. Evaluation Method

With respect to the annealed cold-rolled steel sheets produced under various production conditions, the microstructure fractions were examined by the analysis of the steel microstructures. The tensile characteristics such as elongation and a yield ratio were evaluated by conducting a tensile test. The bendability was evaluated by a bend test. Evaluation methods were described below.

Area Percentage of Martensite (M) and Tempered Martensite (TM)

An L-section of each of the annealed cold-rolled steel sheets, which was a section in the rolling and thickness directions, was mirror-polished, etched with nital to expose microstructures, and observed with a scanning electron microscope. The area percentage of each of martensite and tempered martensite was examined by a point counting method in which a 16×15 grid of points at 4.8 μm intervals was placed on a region, measuring 82 μm×57 μm in terms of actual length, of a SEM image with a magnification of ×1,500 and the points on each phase were counted. The area percentage was defined as the average value of three area percentages determined from different SEM images with a magnification of ×1,500. Martensite appears as a white microstructure. Tempered martensite also appears as a white microstructure. Tempered martensite is more easily etched than martensite and thus has a microstructure in which blocks and packets are exposed in prior austenite grain boundaries.

Area Percentage of Ferrite (α)

An L-section of each of the annealed cold-rolled steel sheets, which was a section in the rolling and thickness directions, was mirror-polished, etched with nital to expose microstructures, and observed with a scanning electron microscope. The area percentage of ferrite was examined by a point counting method in which a 16×15 grid of points at 4.8 μm intervals was placed on a region, measuring 82 μm×57 μm in terms of actual length, of a SEM image with a magnification of ×1,500 and the points on the phase were counted. The area percentage was defined as the average value of three area percentages determined from different SEM images with a magnification of ×1,500. Ferrite appears a dark-gray microstructure that does not contain cementite.

Area Percentage of Bainite (B)

An L-section of each of the annealed cold-rolled steel sheets, which was a section in the rolling and thickness directions, was mirror-polished, etched with nital to expose microstructures, and observed with a scanning electron microscope. The area percentage of bainite was examined by a point counting method in which a 16×15 grid of points at 4.8 μm intervals was placed on a region, measuring 82 μm×57 μm in terms of actual length, of a SEM image with a magnification of ×1,500 and the points on the phase were counted. The area percentage was defined as the average value of three area percentages determined from different SEM images with a magnification of ×1,500. Bainite appears a dark-gray microstructure containing cementite. MA is also present in bainite.

Area Percentage of MA in Bainite and Area Percentage of Cementite (θ) Having Average Grain Size of 1 μm or Less in Bainite An L-section of each of the annealed cold-rolled steel sheets, which was a section in the rolling and thickness directions, was mirror-polished, etched with nital to expose microstructures, and immersed in distilled water, an aqueous sodium hydroxide solution, and a solution containing picric acid. After immersion, cementite of MA and cementite in bainite was dissolved. Thus, the area percentages of MA and cementite were examined by making a distinction between MA and cementite. Regarding an observation method, observation was performed with a scanning electron microscope. The area percentage of MA was examined from the number of MA and the average grain size of MA in a region, measuring 82 μm×57 μm in terms of actual length, of a SEM image with a magnification of ×1,500. The area percentage of cementite was examined from the number of cementite and the average grain size of cementite. MA appears a white microstructure and is characterized in that MA is precipitated in the form of islands in bainite. Cementite precipitated in bainite was measured. The grain size was determined from the average value of lengths of cementite in the rolling direction and in a direction perpendicular to the rolling direction.

FIG. 1 illustrates an example of a microstructure in which area percentages are measured. It is difficult to distinguish between cementite and MA in bainite in FIG. 1. Thus, first, the sum of the area percentages of cementite and MA in bainite is determined.

Figure 2:
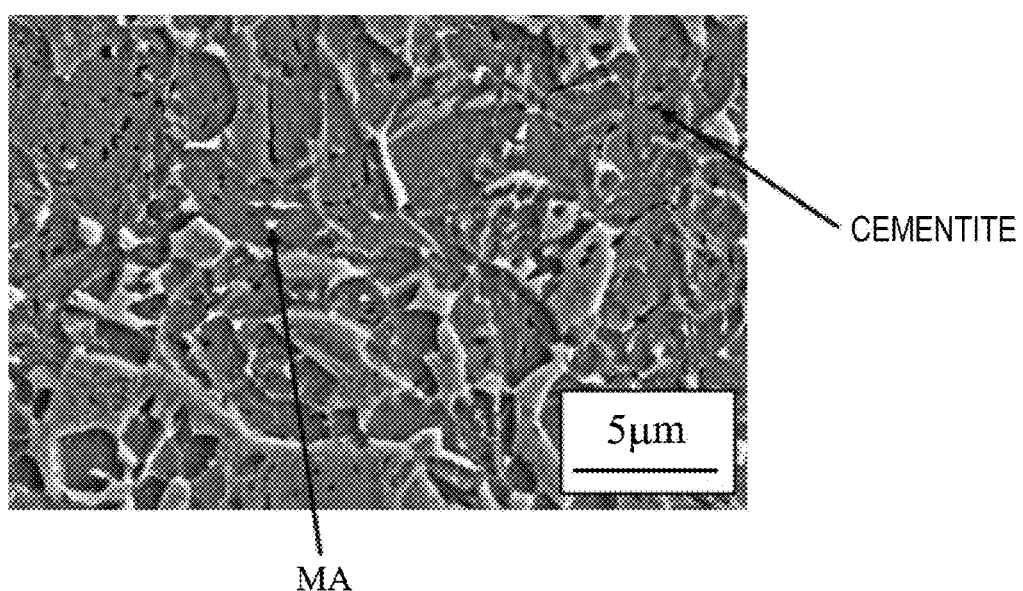
FIG. 2 illustrates an example of a microstructure that has been subjected to two-step etching.

FIG. 2 illustrates an example of a microstructure that has been subjected to two-step etching. In FIG. 2, cementite appears black because cementite has been dissolved and eliminated to form an empty space. Accordingly, the area percentage of cementite was determined from FIG. 2, and then the area percentage of MA was determined from the difference between the area percentage determined from FIG. 1 and the area percentage of cementite. Since the empty space appears black, assuming that portions appearing black are composed of cementite, the average grain size can be calculated.

Tensile Test

JIS No. 5 test pieces having a gauge length of 50 mm, a gauge width of 25 mm, and a thickness of 1.2 mm were sampled from the annealed cold-rolled steel sheets in a direction perpendicular to the rolling direction and subjected to a tensile test at a cross head speed of 10 mm/min to measure tensile strength (TS), yield ratios (YR), and total elongation (El).

Bend Test

Bending test pieces having a width of 25 mm and a length of 100 mm were sampled from the annealed cold-rolled steel sheets such that the rolling direction was a bending direction. The test pieces were subjected to a test (n=3) by a pressing bend method according to JIS Z 2248 at a pressing rate of 100 mm/s and various bending radii. A bending radius at which no crack was formed in all the three test pieces was defined as a limit bending radius (R). Evaluation was performed on the basis of the ratio of the limit bending radius to the thickness (t). The presence or absence of a crack was checked by observation of outer sides of bent portions using a magnifier with a magnification of ×30. When no crack was formed with respect to a width of 25 mm, each test piece was rated "⊚ (excellent)". When at most five microcracks having a length of 0.2 μm or less were formed with respect to a width of 25 mm, each test piece was rated "○ (good)". When one or more cracks having a length of more than 0.2 μm was formed and when more than five microcracks having a length of 0.2 μm or less were formed with respect to a width of 25 mm, each test piece was rated "× (NG)." Each of the samples rated "⊚" and "○" was assumed that no crack was formed. The evaluation criterion for bendability was limit bending radius/thickness (R/t)≤1.5. That is, the evaluation was performed on the basis of the presence or absence of a microcrack and its state when R/t=1.5, where R is the limit bending radius of a sample rated "good (○)."

3. Evaluation Result

Table 3 presents the evaluation results.

TABLE 3

| No. | Type of steel | Martensite + tempered martensite % | Ferrite % | Bainite % | MA % | θ % | TS MPa | YR | El % | R/t | |
|---|---|---|---|---|---|---|---|---|---|---|---|
| 1 | A | 38 | 11 | 51 | 3 | 3 | 971 | 0.62 | 18.3 | ⊙ | Comparative Example |
| 2 |   | 40 | 8 | 52 | 1 | 3.6 | 980 | 0.66 | 18.1 | ⊙ | Example |
| 3 |   | 44 | 2 | 54 | 5 | 0.4 | 1041 | 0.74 | 17.2 | ⊙ | Example |
| 4 | B | 38 | 13 | 49 | 4 | 2 | 972 | 0.63 | 18.1 | ⊙ | Comparative Example |
| 5 |   | 40 | 8 | 52 | 2 | 3.2 | 981 | 0.67 | 17.9 | ⊙ | Example |
| 6 |   | 42 | 6 | 52 | 7 | 4.1 | 1003 | 0.66 | 18.0 | ⊙ | Example |
| 7 | C | 51 | 9 | 40 | 8 | 12 | 1102 | 0.63 | 16.1 | X | Comparative Example |
| 8 |   | 44 | 8 | 48 | 2 | 15 | 1037 | 0.62 | 16.7 | X | Comparative Example |
| 9 |   | 92 | 0 | 8 | 8 | 1.2 | 1508 | 0.68 | 7.2 | X | Comparative Example |
| 10 |   | 49 | 8 | 43 | 2 | 0.9 | 1097 | 0.66 | 16.1 | ○ | Example |
| 11 |   | 44 | 2 | 54 | 1 | 2.1 | 1040 | 0.72 | 17.2 | ⊙ | Example |
| 12 |   | 51 | 7 | 42 | 4 | 14 | 1104 | 0.62 | 16.2 | X | Comparative Example |
| 13 | D | 54 | 13 | 33 | 4 | 1.4 | 1149 | 0.63 | 15.1 | ⊙ | Comparative Example |
| 14 |   | 92 | 0 | 8 | 9 | 0.2 | 1489 | 0.68 | 7.8 | X | Comparative Example |
| 15 |   | 54 | 2 | 44 | 3 | 2.9 | 1139 | 0.71 | 15.4 | ⊙ | Example |
| 16 |   | 61 | 7 | 32 | 1 | 1.3 | 1207 | 0.67 | 13.9 | ⊙ | Example |
| 17 | E | 61 | 13 | 26 | 6 | 0.5 | 1174 | 0.63 | 14.3 | ⊙ | Comparative Example |
| 18 |   | 70 | 8 | 22 | 2 | 3.6 | 1267 | 0.67 | 12.4 | ○ | Example |
| 19 |   | 43 | 2 | 55 | 4 | 4.2 | 989 | 0.71 | 17.7 | ⊙ | Example |
| 20 |   | 62 | 16 | 22 | 4 | 2.1 | 1174 | 0.61 | 13.7 | ⊙ | Comparative Example |
| 21 |   | 82 | 9 | 9 | 11 | 2.2 | 1335 | 0.64 | 10.3 | ⊙ | Comparative Example |
| 22 |   | 67 | 18 | 15 | 3 | 2.6 | 1220 | 0.62 | 13.1 | ⊙ | Comparative Example |
| 23 | F | 57 | 13 | 30 | 7 | 0.8 | 1173 | 0.63 | 14.9 | ⊙ | Comparative Example |
| 24 |   | 59 | 15 | 26 | 1 | 0.7 | 1191 | 0.62 | 14.1 | ⊙ | Comparative Example |
| 25 |   | 91 | 0 | 9 | 5 | 0.5 | 1482 | 0.71 | 7.9 | X | Comparative Example |
| 26 |   | 72 | 12 | 16 | 2 | 2.1 | 1319 | 0.64 | 11.8 | ○ | Comparative Example |
| 27 |   | 58 | 0 | 42 | 4 | 2.8 | 1193 | 0.72 | 14.2 | ⊙ | Example |
| 28 |   | 32 | 0 | 68 | 3 | 4.1 | 927 | 0.71 | 19.7 | ⊙ | Example |
| 29 |   | 58 | 0 | 42 | 1 | 6.2 | 1187 | 0.74 | 14.3 | X | Comparative Example |
| 30 | G | 51 | 14 | 35 | 3 | 1.9 | 1108 | 0.63 | 15.8 | ⊙ | Comparative Example |
| 31 |   | 53 | 4 | 43 | 12 | 2.1 | 1129 | 0.62 | 15.6 | ⊙ | Comparative Example |
| 32 |   | 50 | 0 | 50 | 7 | 0.3 | 1102 | 0.7 | 15.9 | ⊙ | Example |
| 33 |   | 52 | 0 | 48 | 3 | 0.9 | 1125 | 0.71 | 15.7 | ⊙ | Example |
| 34 | H | 47 | 2 | 51 | 2 | 1.8 | 1074 | 0.71 | 17.4 | ⊙ | Example |
| 35 |   | 17 | 0 | 83 | 4 | 0.7 | 768 | 0.69 | 22.9 | ⊙ | Comparative Example |
| 36 |   | 16 | 2 | 82 | 1 | 8.3 | 764 | 0.68 | 23.1 | X | Comparative Example |
| 37 |   | 44 | 4 | 52 | 3 | 1.1 | 1036 | 0.69 | 17.7 | ⊙ | Example |
| 38 | I | 51 | 12 | 37 | 3 | 0.7 | 1105 | 0.63 | 15.9 | ⊙ | Comparative Example |
| 39 |   | 56 | 2 | 42 | 1 | 1.5 | 1158 | 0.67 | 14.9 | ⊙ | Example |
| 40 |   | 61 | 0 | 39 | 6 | 2.3 | 1213 | 0.73 | 13.8 | ○ | Example |
| 41 | J | 53 | 16 | 31 | 2 | 3.4 | 1126 | 0.63 | 15.5 | ⊙ | Comparative Example |
| 42 |   | 52 | 14 | 34 | 2 | 1 | 1123 | 0.63 | 15.6 | ⊙ | Comparative Example |
| 43 | K | 26 | 8 | 66 | 1 | 1.7 | 771 | 0.67 | 22.4 | ⊙ | Comparative Example |
| 44 | L | 67 | 1 | 32 | 2 | 5.3 | 1279 | 0.69 | 12.7 | X | Comparative Example |
| 45 | M | 31 | 13 | 56 | 2 | 3.9 | 874 | 0.62 | 20.6 | ⊙ | Comparative Example |
| 46 | N | 91 | 0 | 9 | 1 | 2.1 | 1495 | 0.7 | 7.6 | X | Comparative Example |
| 47 | O | 53 | 4 | 43 | 3 | 0.7 | 1134 | 0.67 | 15.6 | X | Comparative Example |
| 48 | P | 49 | 6 | 45 | 2 | 1.6 | 1090 | 0.66 | 16.2 | X | Comparative Example |
| 49 | Q | 37 | 16 | 47 | 3 | 1.9 | 971 | 0.61 | 18.4 | ⊙ | Comparative Example |
| 50 | R | 47 | 4 | 49 | 3 | 2.2 | 1074 | 0.67 | 16.4 | X | Comparative Example |

A steel sheet having a tensile strength (TS) of 780 MPa or more, a yield ratio (YR) of 0.65 or more, and bendability rated "○" or better was accepted.

In Table 3, the steel sheets of Examples were composed of our steels that satisfy all our requirements and had a tensile strength (TS) of 780 MPa or more, a yield ratio (YR) of 0.65 or more, and bendability rated "○" or better. All of the steel sheets of the examples are high-strength cold-rolled steel sheets having a high yield ratio and good bendability.

In the steel sheets of Comparative Examples in Table 3, the tensile strength, the yield ratio (YR), or the bendability was not satisfactory.

In each of sample Nos. 1, 4, 30, and 38, regarding the production conditions, since secondary annealing temperature was lower than our range, the area percentage of ferrite was more than 10% with respect to the entire steel sheet, resulting in a poor yield ratio.

In sample No. 7, regarding the production conditions, since the finish rolling temperature in the hot rolling was lower than our range, the area percentage of cementite in bainite was more than 5.0%, resulting in poor bendability.

In sample No. 8, regarding the production conditions, since the average cooling rate in the hot rolling was lower than our range, the area percentage of cementite having an average grain size of 1 μm or less in bainite was more than 5.0%, resulting in poor bendability.

In sample No. 9, regarding the production conditions, the coiling temperature in the hot rolling was lower than our range. Thus, with respect to the entire steel sheet, the area percentage of bainite was less than 10%, and the area percentage of martensite was more than 90%, resulting in bendability.

In sample No. 12, regarding the production conditions, because the coiling temperature in the hot rolling was higher than our range, the area percentage of cementite having an average grain size of 1 μm or less in bainite was more than 5.0%, resulting in poor bendability.

In sample No. 13, regarding the production conditions, the rolling reduction in the cold rolling was lower than our range. Thus, the area percentage of ferrite was 10% or more with respect to the entire steel sheet, resulting in a poor yield ratio.

In sample No. 14, tertiary holding time was zero seconds, i.e., cooling was immediately performed without holding. Thus, with respect to the entire steel sheet, the area percentage of bainite was less than 10%, and the area percentage of martensite was more than 90%, resulting in poor bendability.

In samples Nos. 17, 20 to 22, and 26, regarding the production conditions, primary annealing conditions in the continuous annealing were lower than our ranges. Thus, poor yield ratios were obtained.

In samples No. 23 and 24, regarding the production conditions, secondary annealing conditions in the continuous annealing were lower than our ranges. Thus, the area percentage of ferrite in each sample was more than 10% with respect to the entire steel sheet, resulting in a poor yield ratio.

In sample No. 25, regarding the production conditions, tertiary holding temperature in the continuous annealing was lower than our range. Thus, with respect to the entire steel sheet, the area percentage of bainite was less than 10%, and the area percentage of martensite was more than 90%, resulting in poor bendability.

In sample No. 29, regarding the production conditions, since tertiary holding temperature in the continuous annealing was higher than our range, the area percentage of cementite having an average grain size of 1 μm or less in bainite was more than 5.0%, resulting in poor bendability.

In sample No. 31, the excessively long secondary holding time resulted in an increase in the amount of MA in bainite, leading to a poor yield ratio.

In each of sample Nos. 35 and 36, regarding the production conditions, since the final cooling rate or tertiary holding time in the continuous annealing was outside our range, the total of martensite and tempered martensite was decreased, resulting in low strength.

In each of sample Nos. 41 and 42, because of a high Si content, the area percentage of ferrite was 10% or more with respect to the entire steel sheet, resulting in a poor yield ratio.

In each of sample Nos. 43 and 45, regarding the components, the C content or the Mn content was lower than our range, thus resulting in a tensile strength of less than 780 MPa or a poor yield ratio.

In each of samples Nos. 44 and 46, regarding the components, the C content or the Mn content was higher than our range, thus resulting in poor bendability.

In each of sample Nos. 47, 48, and 50, the P content, the S content, or the N content was outside our range, thus resulting in poor bendability.

In sample No. 49, the Al content was outside our range, thus resulting in a poor yield ratio.

While production of the annealed cold-rolled steel sheets has been described in the examples, the same effects were provided in a steel sheet that had been subjected to coating treatment.

The invention claimed is:

1. A high-strength cold-rolled steel sheet having a component composition comprising, on a percent by mass basis:
   C: 0.12% or more and 0.25% or less;
   Si: less than 0.5%;
   Mn: 2.0% or more and 3.0% or less;
   P: 0.05% or less;
   S: 0.005% or less;
   Al: 0.01% or more and 0.10% or less; and
   N: 0.010% or less, the balance being Fe and incidental impurities,
   a total area percentage of martensite and tempered martensite satisfying 20% or more and 90% or less, an area percentage of ferrite satisfying 10% or less, an area percentage of bainite satisfying 42% or more and 80% or less, an area percentage of a martensite-austenite constituent in the bainite being 1% or more and 10% or less, an area percentage of cementite having an average grain size of 1 μm or less in bainite being 0.1% or more and 5.0% or less,
   wherein a bendability (R/t) is 1.5 or less, where R is a limit bending radius and t is a thickness.

2. The high-strength cold-rolled steel sheet according to claim 1, wherein the component composition further comprises one or more selected from at least one groups of A to D, on a percent by mass basis,
   group A:
      B: 0.005% or less;
   group B:
      one or two or more elements selected from:
      Nb: 0.005% or more and 0.1% or less;
      Ti: 0.005% or more and 0.1% or less; and
      V: 0.005% or more and 0.3% or less;
   group C:
      one or two or more elements selected from:
      Mo: 0.2% or less;
      Cr: 1.0% or less;
      Cu: 1.0% or less; and
      Ni: 1.0% or less;
   group D:
      one or two elements selected from:
      Ca: 0.0005% or more and 0.01% or less; and
      REM: 0.0005% or more and 0.01% or less.

3. The high-strength cold-rolled steel sheet according to claim 2, further comprising a coated layer on a surface thereof.

4. The high-strength cold-rolled steel sheet according to claim 1, further comprising a coated layer on a surface thereof.

5. The high-strength cold-rolled steel sheet according to claim 4, wherein the coated layer is a hot-dip galvanized layer, a hot-dip galvannealed layer, or a Zn—Al coated layer.

6. The high-strength cold-rolled steel sheet according to claim 3, wherein the coated layer is a hot-dip galvanized layer, a hot-dip galvannealed layer, or a Zn—Al coated layer.

7. The high-strength cold-rolled steel sheet according to claim 1, wherein the component composition consists of, on a percent by mass basis:
   C: 0.12% or more and 0.25% or less;
   Si: less than 0.5%;
   Mn: 2.0% or more and 3.0% or less;

P: 0.05% or less;
S: 0.005% or less;
Al: 0.01% or more and 0.10% or less; and
N: 0.010% or less, the balance being Fe and incidental impurities,
optionally, one or more selected from at least one groups of A to D, on a percent by mass basis,
group A:
B: 0.005% or less;
group B:
one or two elements selected from:
Ti: 0.005% or more and 0.1% or less; and
V: 0.005% or more and 0.3% or less;
group C:
one or two or more elements selected from:
Mo: 0.2% or less;
Cr: 1.0% or less;
Cu: 1.0% or less; and
Ni: 1.0% or less;
group D:
one or two elements selected from:
Ca: 0.0005% or more and 0.01% or less; and
REM: 0.0005% or more and 0.01% or less.

8. A method of producing a high-strength cold-rolled steel sheet according to claim 1, comprising:
a hot-rolling step of rolling a slab having the component composition according to claim 1 at a finish hot rolling temperature of 800° C. or higher and 1,000° C. or lower, performing cooling at an average cooling rate of 20° C./s or more, and performing coiling at a coiling temperature of 550° C. or higher and 700° C. or lower;
a cold-rolling step of cold-rolling a hot-rolled steel sheet produced in the hot-rolling step at a rolling reduction of 20% or more; and
an annealing step of performing primary annealing including primary heating to heat a cold-rolled steel sheet produced in the cold-rolling step in a temperature range of an $Ac_3$ point to 900° C., primary holding to hold the cold-rolled steel sheet in the temperature range of the $Ac_3$ point to 900° C. for 10 seconds or more and 1,200 seconds or less, and after the primary holding, primary cooling to cool the cold-rolled steel sheet to a cooling stop temperature of 100° C. or lower at an average cooling rate of 3° C./s or more; after the primary annealing, secondary annealing including secondary heating to heat the cold-rolled steel sheet in a temperature range of higher than the $Ac_3$ point to 900° C., secondary holding to hold the cold-rolled steel sheet in the temperature range of higher than the $Ac_3$ point to 900° C. for 10 seconds or more and 1,200 seconds or less, and after the secondary holding, secondary cooling to cool the cold-rolled steel sheet to a cooling stop temperature of 350° C. or higher and 600° C. or lower at an average cooling rate of 10° C./s or more; after the secondary annealing, tertiary holding to hold the cold-rolled steel sheet in a temperature range of 350° C. to 600° C. for 1 second or more and 1,200 seconds or less; and tertiary cooling to cool the cold-rolled steel sheet at an average cooling rate of 5° C./s or more.

9. The method according to claim 8, further comprising, after the annealing step, a coating step of performing coating treatment on a surface of the cold-rolled steel sheet.

10. A method of producing a high-strength cold-rolled steel sheet according to claim 2, comprising:
a hot-rolling step of rolling a slab having the component composition according to claim 2 at a finish hot rolling temperature of 800° C. or higher and 1,000° C. or lower, performing cooling at an average cooling rate of 20° C./s or more, and performing coiling at a coiling temperature of 550° C. or higher and 700° C. or lower;
a cold-rolling step of cold-rolling a hot-rolled steel sheet produced in the hot-rolling step at a rolling reduction of 20% or more; and
an annealing step of performing primary annealing including primary heating to heat a cold-rolled steel sheet produced in the cold-rolling step in a temperature range of an $Ac_3$ point to 900° C., primary holding to hold the cold-rolled steel sheet in the temperature range of the $Ac_3$ point to 900° C. for 10 seconds or more and 1,200 seconds or less, and after the primary holding, primary cooling to cool the cold-rolled steel sheet to a cooling stop temperature of 100° C. or lower at an average cooling rate of 3° C./s or more; after the primary annealing, secondary annealing including secondary heating to heat the cold-rolled steel sheet in a temperature range of higher than the $Ac_3$ point to 900° C., secondary holding to hold the cold-rolled steel sheet in the temperature range of higher than the $Ac_3$ point to 900° C. for 10 seconds or more and 1,200 seconds or less, and after the secondary holding, secondary cooling to cool the cold-rolled steel sheet to a cooling stop temperature of 350° C. or higher and 600° C. or lower at an average cooling rate of 10° C./s or more; after the secondary annealing, tertiary holding to hold the cold-rolled steel sheet in a temperature range of 350° C. to 600° C. for 1 second or more and 1,200 seconds or less; and tertiary cooling to cool the cold-rolled steel sheet at an average cooling rate of 5° C./s or more.

11. The method according to claim 10, further comprising, after the annealing step, a coating step of performing coating treatment on a surface of the cold-rolled steel sheet.

* * * * *